United States Patent [19]

Alia

[11] 4,180,531

[45] Dec. 25, 1979

[54] PROCESSIBLE AND VULCANIZABLE POLAR POLYMERS

[76] Inventor: Dominic Alia, 1609 Sheridan St., Williamsport, Pa. 17701

[21] Appl. No.: 742,398

[22] Filed: Nov. 16, 1976

[51] Int. Cl.$^2$ .................... C08L 23/08; C08L 23/28; C08L 23/34

[52] U.S. Cl. .................... 525/214; 525/239; 525/263

[58] Field of Search ............... 260/889, 897 B, 897 C

[56] References Cited

U.S. PATENT DOCUMENTS

| | | | |
|---|---|---|---|
| 3,226,356 | 12/1965 | Kehr et al. | 526/22 |
| 3,227,698 | 1/1966 | Robinson | 526/19 |
| 3,228,762 | 1/1966 | Luckenbaugh | 71/83 |
| 3,288,762 | 11/1966 | Maynard | 526/52 |
| 3,296,184 | 1/1967 | Portolani et al. | 526/19 |
| 3,300,541 | 1/1967 | Latty | 526/20 |
| 3,301,837 | 1/1967 | Bartorelli et al. | 526/19 |
| 3,340,245 | 9/1967 | Oser et al. | 526/12 |
| 3,372,139 | 3/1968 | Behr et al. | 526/19 |
| 3,399,181 | 8/1968 | Bornemann et al. | 526/17 |
| 3,780,141 | 12/1973 | Jin et al. | 260/897 C |
| 3,796,776 | 3/1974 | Ide et al. | 260/897 C |
| 3,923,947 | 12/1975 | Cook | 526/22 |
| 3,934,056 | 1/1976 | Yoshida et al. | 260/897 C |
| 3,954,907 | 5/1976 | Schober | 526/13 |
| 4,049,747 | 9/1977 | Jin et al. | 260/897 C |

FOREIGN PATENT DOCUMENTS

| | | | |
|---|---|---|---|
| 48-32492 | 5/1973 | Japan | 260/897 B |
| 952336 | 3/1964 | United Kingdom | 260/889 |

*Primary Examiner*—Allan Lieberman
*Attorney, Agent, or Firm*—Sughrue, Rothwell, Mion, Zinn and Macpeak

[57] ABSTRACT

A method of promoting peroxide initiated crosslinking of polar polymers whereby the solubility of peroxide vulcanizing agents in these materials is increased. Increased peroxide solubility and/or processibility is accomplished by blending certain ethylene copolymers with these highly polar polymers. The blending of ethylene copolymers with the polar polymers substantially reduces the viscosity of the latter polymers thereby enhancing their processibility.

14 Claims, No Drawings

PROCESSIBLE AND VULCANIZABLE POLAR POLYMERS

BACKGROUND OF THE INVENTION

The invention relates to processible compositions based on polar polymers and peroxide-vulcanizable compositions prepared therefrom.

Since the advent of highly polar polymers to commercial markets, they have been found extremely useful in preparing vulcanized products. Although laboratory peroxide-cured specimens of some of these polymers have been prepared, the properties of such vulcanizates have been considered inferior to the more conventionally vulcanized systems. A number of polar polymers such as chlorinated polyethylene and poly(vinyl chloride) have not effectively been vulcanized with peroxide type agents.

In their uncured state, polar polymers are tough materials which are difficult to handle at normal processing temperatures of about 100° to 160° C. To improve the processing characteristics of these polymers, physical plasticizers are used. These plasticizers are known to limit the crosslinking efficiency of peroxide vulcanizing agents, and in cases involving more conventional vulcanizing agents, plasticizers reduce some important vulcanizate properties.

It is known that peroxide crosslinking is a first order reaction whereby the rate of said reaction is independent of peroxide concentration or quantity of peroxide, but is primarily dependent on temperature. It has been found that the rate (half-life) of peroxide decomposition—which initiates polymer crosslinking—is strongly affected by the polymer, antioxidants, oils, plasticizers, and fillers comprising the vulcanizable compositions. These experimental facts, however, have not been unraveled to determine the reasons for this chemical behavior. Therefore, peroxide vulcanizates of polar polymers have not gained economic prominance and some of their unique properties remain unattainable.

My copending application, temporary Ser. No. 735,225 describes a novel process for the formation of crosslinkable compositions including these polar polymers.

SUMMARY OF THE INVENTION

A commercial technique has now been found that greatly improves the processing character of polar polymers at temperatures about 100° to 160° C., without reducing the efficiency of peroxide crosslinking agents which may be added and without diminishing the physical and chemical properties of the resulting vulcanizate. This is accomplished by incorporating in such polar polymers certain ethylene copolymers.

An object of the present invention is to provide extrudable compositions based on polar polymers which can also be successfully vulcanized with peroxide vulcanizing agents.

Another object of the present invention is to provide callenderable compositions based on polar polymers which can be successfully vulcanized with peroxide vulcanizing agents.

Another object of the present invention is to provide peroxide vulcanizable neoprene, hypalon and nitrile rubber based compositions which are less scorchy than the corresponding compositions based on conventionally used crosslinking agents which are chemically active at ambient temperatures.

A further object of the present invention is to provide an integral insulation-jacket composition based on chlorinated polyethylene for electrical wire and cable use which is flame-, oil-, heat-, and moisture-resistant. These and other objectives of the present invention are achieved by using certain ethylene copolymers as processing aids and curing aids in other more highly polar polymers.

DETAILED DESCRIPTION OF THE INVENTION

The processible peroxide-vulcanizable compositions based on polar polymers of the present invention comprise in weight ratio 100 parts by weight of polar polymer and about 0.1 to 10.0, preferably about 0.1 to 5.0 and most preferably 0.2 to 2.0 parts by weight of at least one peroxide compound of the dialkyl peroxide type as described below and about 10 to 400 and preferably 30 to 300 parts by weight of at least one ethylene copolymer.

The processible compositions based on polar polymers without crosslinking agents have the same ranges of components as indicated above. These compositions are extrudable and callenderable and can readily be shaped within the temperature range of thermoplastic processing equipment, e.g., about 350° F. Especially preferred polar polymers for this aspect of the present invention are PVC and chlorinated polyethylene. These materials are hard and usually must be melted before processing can take place. It has unexpectedly been found that the addition of an ethylene copolymer as set forth herein can render these polar polymers markedly more workable without liquid plasticizers. Thus, the characteristics and compositional ranges for these processible compositions are the same as set forth herein for the vulcanizable compositions with a peroxide crosslinking agent. A peroxide crosslinking agent may be added to the composition thereafter by conventional means.

Processible vulcanizable compositions are defined in the present invention as those compositions comprising polar polymers and at least one peroxide type vulcanizing agent. They also possess certain plastic properties in the uncured state and certain curing characteristics. The plastic properties of processible compositions are quantitatively measured with the testing apparatus listed below. The measurements should fall within the ranges given below for the Mooney Viscosity, extrusion properties and curing characteristics (if a vulcanizable composition is prepared).

The Mooney viscosity, an indication of a composition's workability, is measured at 121° C. with a Mooney Viscometer equipped with the large serrated rotor which rotates at two revolutions per minute. The specimen, enough to slightly overfill the cavity, is preheated one minute before the rotor motion is initiated and the readings recorded at time intervals. The three-minute viscosity reading of processible compositions should fall in a Mooney viscosity range of 2 to 75 Mooney points, symbolically designated as: 121° C. ML(1+3) min.

Extrusion Properties, as measured with a laboratory-scale Brabender extrusion apparatus, are an indication of the extruding character of processible compositions in commercial-scale extrusion equipment. A sample of the material is extruded through a rod-forming, ⅛ inch diameter die with zero land, by means of an extruder equipped with a conventional, plastic-metering screw which rotates at 30 to 60 rpm. The zone and head temperature settings are maintained in the range of 100° to 130° C. The readouts and the ranges of these as given below, define processibility of the compositions:

Head pressure in the range of 250 to 3,000 psi

Stock temperature in the range of 110° to 150° C.

Developed torque in the range of 1500 to 4500 meter-grams

Extrudate die swell (that fraction of the die diameter) in the range of 1.0 to 1.6

Qualitatively, the surface appearance of the extrudate should be smooth.

The curing characteristics of vulcanizable compositions based on polar polymers can quantitavely be measured with a Monsanto Oscillating Disc Rheometer operated between 160° and 205° C. The apparatus measures the development of chemical crosslinks within the specimen by recording the developing torque required to maintain a rotor oscillating within a ±3 degree arc at 100 cycles per minute while it is embedded within the curing speciment. Increasing torque in "in-lbs" is directly related of the number of crosslinks present in the specimen. The plot of torque development in in-lbs versus time in minutes provides a means of catagorizing processible, vulcanizable compositions. In addition, it is a means of measuring the peroxide crosslinking efficiency in various polymer compositions.

Processible peroxide-vulcanizable compositions are characterized by a Monsanto Oscillating Disc Rheometer cure plot obtained at 205° C. These plots show:

a minimum torque value in the range of 2 to 15 in-lbs a maximum torque in the range of 20 to 90 in-lbs a scorch time (the total time required for the torque to rise 2 in-lbs above the minimum value) in the range of 0.5 to 2.0 minutes and an effective composition crosslinking half-life in the range of 0.2 to 1.5 minutes The following polar polymers can be used in the present invention.

Chlorinated Polyethylene: The family of polymers referred to as chlorinated polyethylene is produced by the random chlorination of high density polyethylene. The chlorine content of these polymers can range from 10 to 80 percent by weight. The melt viscosity of these polymers ranges from 1 to 40,000 poises as measured at 150 sec.$^{-1}$ shear rate in a 0.05 inch×2 inch capillary at 190° C. at apparent shear stress ranging from 1 to 100 psi.

Polychloroprene: More commonly known as Neoprene, this is a synthetic polymer containing 40 percent by weight chlorine. The specific gravity of neoprene is 1.23. Its viscosity as measured with a Mooney Viscometer at 100° C. ML (1+4) minutes ranges from 25 to 110 Mooney points. It is a solid at 25° C.

Chlorosulfonated Polyethylene: More commonly known as Hypalon, this is a synthetic polymer ranging in specific gravity from 1.10 to 1.35. In general, hypalon has a chlorine content of about 20 to 50% by weight and a sulfur content of about 0.75 to 1.5% by weight. Its viscosity as measured with a Mooney Viscometer at 100° C. ML (1+4) minutes ranges from 25 to 120 Mooney points. Hypalon is a solid at 25° C.

Poly(vinyl chloride): PVC is a synthetic polymer containing about 55 percent by weight chlorine and has a specific gravity of about 1.41. It is a solid at 25° C.

Butadiene Acrylonitrile Copolymers: These are synthetic polymers with an acrylonitrile content range of 20 to 45 percent by weight. These polymers range in specific gravity from 0.96 to 1.02. Their viscosity range as measured with a Mooney Viscometer at 100° C. and ML (1+4) minutes is from 30 to 80 Mooney points. These polymers are solids at 25° C.

Blends of Butadiene Acrylnitrile Copolymer and Poly(vinyl chloride): Blends of the synthetic polymers butadiene acrylonitrile copolymers and poly(vinyl chloride) can range in PVC content by weight from 25 to 50 percent by weight. Each of the poly(vinyl chloride) and butadiene-acrylonitrile copolymer used in this blend are preferably as defined above in terms of chlorine content and acrylonitrile content, respectively. These blends range in viscosity as measured with a Mooney Viscometer at 100° C. and ML (1+4) minutes from 45 to 90 Mooney points. These blends range in specific gravity from 1.06 to 1.12 and they are solids at 25° C.

The peroxide vulcanizing agents made reference to in the present invention are of the dialkyl peroxide group which includes:

di-t-butyl peroxide dicumyl peroxide 2,5-dimethyl-2,5-bis-(t-butylperoxy) hexyne-3

2,5-dimethyl-2,5-bis-(t-butylperoxy) hexane a,a'-bis-(t-butylperoxy) diisopropylbenzene Dialkyl peroxides are organic compounds that have the following general formula:

where R' and R are alkyl or substituted alkyl groups and x is either 1 or 2. The alkyl groups preferably have from about 4 to 15 carbon atoms. These peroxide compounds also have a decomposition half-life of about 0.2 to 5 minutes at 160° to 200° C.

The energy requirements necessary to initiate the peroxide crosslinking reaction can be supplied by a number of energy forms such as heat, radiation, ultrasonic energy or micro-waves.

Ethylene copolymers which are used in the compositions of the present invention are solid materials at 25° C. The ethylene copolymers contain at least 50 weight percent of ethylene and up to about 50 weight percent of one or more other organic compounds which are interpolymerizable with ethylene and preferably those which contain polymerizable unsaturation, such as is present in compounds containing an ethylene linkage (>C═C<). These other interpolymerizable compounds may be bicycloheptene, bicycloheptadiene, styrene, as well as vinyl compounds such as vinyl acetate and ethyl acrylate. Thus, for example, these copolymers could contain greater than zero and up to 50 weight percent vinyl acetate and from 50 to less than 100 weight percent of ethylene.

The ethylene copolymers described herein may be used individually or in combination. The ethylene copolymers have densities that range from 0.92 to 0.96 (ASTM D-792-60T) and a Melt Index of 0.2 to 200 g/10 min. (ASTM D-1238-62T).

Additives may be present in the processible compositions of the present invention.

Thus, the processible compositions based on polar polymers preferrably also include about 0.1 to 3.0 and preferably 0.25 to 1.5 parts by weight of one or more suitable antioxidants for 100 parts by weight of total polymer in the compositions.

The amine type antioxidant is preferred because it has the least affect on peroxide-initiated cure. In general, phenolic-type antioxidants inhibit cure to a greater extent. However, sterically hindered phenols have been found to be useful in polar polymer and ethylene copolymer systems. These sterically hindered phenols include:

1,3,5-trimethyl-2,4,6-tris-(3,5-ditertiary butyl-4-hydroxy benzyl) benzene 1,3,5-tris-(3,5-ditertiary butyl-4-hydroxy benzyl)-5-triazine-2,4-6-(1H, 3H, 5H) trione tetrakis-[methylene-3-(3,5-di-tertiary butyl-4-hydroxy phenyl)-propionate] methane di-(2-methyl-4-hydroxy-5 tertiary butyl phenyl) sulfide Amine type antioxidants such as polymerized 2,2,4-trimethyl dihydroquinoline are useful in protecting the compositions of the present invention against oxidation.

Other additive ingredients which can be advantageously included in the compositions of the present invention are flame retardants which can be included singly or in combination. Such materials include antimony oxide when added in about 0.5 to 5.0 parts by weight to 100 parts by weight of halogen-containing polymer; "Firebrake" ZB, supplied by the U.S. Borax and Chemical Co. when added in about 0.5 to 5.0 parts by weight to 100 parts by weight of halogen-containing polymer; "Dechlorane" supplied by the Hooker Chemicals and Plastics Corp. when added in about 0.1 to 20 parts by weight to 100 parts by weight to total polymer; "Flametamer" family of materials supplied by the Hooker Chemicals and Plastics Corporation when added in about 0.1 to 20 parts by weight to 100 parts by weight of total polymer.

Other additive ingredients which can be advantageously included in the compositions of the present invention are smoke suppressants such as FE-55, DFR-121, and FE-65; supplied by the Arapahoe Chemicals, Inc. when added in about 1 to 15 parts by weight to 100 parts by weight of halogen-containing polymer.

Polymers containing halogen should be stabilized to withstand processing and service conditions. The compositions of the present invention can be stabilized by the inclusion of one or more of the following stabilizers in the given ranges based upon 100 parts by weight of halogen containing polymers: organotin (non-mercaptide) in about 0.5 to 3.0 and preferably 1.5 to 2.5 parts by weight; the system of barium cadmium in about 0.5 to 3.0 and preferably 1.0 to 2.0 parts by weight and Phosphite Chelator in about 0.25 to 1.0 parts by weight and epoxidized soybean oil in about 2.0 to 4.0 parts by weight and a lubricant such as chlorowax-40 in about 0.25 to 1.0 parts by weight; a system of dibasic lead phthalate in about 3 to 7 parts by weight and dibasic lead stearate in about 0.5 to 2 parts by weight; a system of calcium stearate in about 1.0 to 3.0 parts by weight and Phosphite Chelator in about 0.25 to 1.0 parts by weight and expoxidized soybean oil in about 40 to 60 parts by weight; Litharge (PbO) in about 1.0 to 15 and preferably 2.0 to 7 parts by weight; Red Lead ($Pb_3O_4$) in about 1.0 to 15 and preferably 2 to 7 parts by weight; tribasic lead sulfate in about 1.0 to 10 and preferably 2.0 to 7 parts by weight; basic lead silicate sulfate in about 1.0 to 10.0 and preferably 2.0 to 7.0 parts by weight.

Other additives which may be used in the compositions of the present invention would be those commonly used in rubber and plastic compounding such as fillers which include carbon black, clay (hydrated aluminum silicate), calcined clays, silane treated clays, talc, calcium carbonate, UV stabilizers, dyes, colorants, and certain lubricants. These additives would be used in amounts designed to provide the intended effect in the resulting composition.

The Monsanto Oscillating Disc Rheometer (ODR) has proved to be a useful tool in the study of peroxide crosslinking kinetics. The ODR should be set at an oscillation rate of 3 to 100 cycles per minute and an oscillating arc of ±3 degrees. ODR torque is directly related to the number of crosslinks formed during peroxide vulcanization. The crosslinking half-life is determined by plotting the log of the difference between the torque at a particular time and the torque at time infinity against time. The resulting curve is a straight line of slope "m" which is related to effective crosslinking half-life of peroxide vulcanizing agents, ($t_{1/2}$) by:

$$t_{1/2} = -0.301/m$$

Practically, the torque at time infinity is the maximum torque recorded by the ODR.

The invention will now be described by several Examples which are not meant to limit the invention.

The processible, vulcanizable compositions based on a blend of a polar polymer and an ethylene copolymer, as defined above, used in the following examples were admixed in an internal, high-shear mixing device. Both laboratory and pilot plant scaled devices were used, that is, a BR and an 1-A Banbury, to admix the ingredients. The total polymer, together with the antioxidants and stabilizers were fluxed in the Banbury Mixer, which was stabilized at about 65° C. The fluxed material temperature was allowed to reach about 110° C., before the other additives were introduced, including the peroxide vulcanizing agent. The temperature of the total mass was allowed to reach 120° C. whereupon it was discharged from the mixer onto a two roll mill maintained at about 75° to 100° C. The material was taken from the mill in strip form and sheet form approximately ⅛ inch by 2 inches and ⅛ inch by 18 inches respectively. In this form, the compositions were used in the Monsanto Oscillating Disc Rheometer. All the rheometer data was obtained at 205° C.

COMPARISON EXAMPLES 1 AND 2

Examples 1 and 2 are given to show the effects of antioxidant on the effective half-life of peroxide vulcanizing agents in formulations outside the embodiment of the present invention. These examples also depict the ineffectiveness of recommended liquid plasticizers such as chlorowax-40 and admixtures of ethylene-propylene copolymers in promoting plasticization of chlorinated polyethylene.

Comparison of the recipes and ODR data of Examples 1 and 2 clearly shows that increasing the level of antioxidant, i.e., the polymerized 2,2,4-trimethyl dihydroquinoline, increases the effective crosslinking half-life of the peroxide vulcanizing agent. The rate of crosslinking is decreased, or the crosslinking efficiency of the peroxide vulcanizing agent is reduced.

Additionally, the addition of the liquid plasticizers, e.g., chlorowax-40 which is recommended for use with chlorinated polyethylene, is only minimally effective reducing the viscosity of the composition as indicated by the minimum torque values from the ODR data. Minimum torque values as high as 18.2 and 25 in-lbs at 205° C. are a sign of the poor processing character of the composition. These two recipes could hardly be used as stocks for extrusion or callendering.

| INGREDIENTS | PARTS BY WEIGHT EXAMPLE 1 | PARTS BY WEIGHT EXAMPLE 2 |
|---|---|---|
| CPE 566 (36% chlorine) 121° C. ML (1 + 3) = 90 DOW Chemical | 100.0 | 100.0 |
| EPR Vistalon 404 Exxon Chemical Div. | 6.0 | 10.0 |
| Polymerized 2,2,4-trimethyl di-hydroquinoline R. T. Vanderbilt | 1.25 | 4.0 |
| Dicumyl peroxide Hercules Corp. | 2.50 | 3.1 |
| Master batch of triallylcyanurate Kenrich Petrochemical | 1.50 | 2.0 |
| Basic lead silicate sulfate (Tribase E) NL Industries | 15.0 | 14.5 |
| K-E Clay (silane treated calcined clay) Burgess Pigment | 50.0 | 49.1 |
| Carbon Black D-990 R. T. Vanderbilt | 9.75 | — |
| Oletac (atactic polypropylene) Paisley Products | 6.0 | — |
| Chlorowax (chlorinated paraffin) Diamond Shamrock | 8.0 | — |
| Total parts by weight | 200.00 | 187.7 |
| ODR Curve at 205 C. | | |
| Maximum torque (in-lbs) | 42.0 | 75.0 |
| Minimum torque (in-lbs) | 18.2 | 25.0 |
| scorch time in minutes* | 1.6 | 1.5 |
| Time to 50% cure in minutes | 2.5 | 2.75 |
| Time to 90% cure in minutes | 3.75 | 5.25 |
| Effective crosslinking half-life | 0.65 minutes | 0.95 minutes |

*time in minutes when torque rises 2 in-lbs above minimum torque value

COMPARISON EXAMPLE 3 and EXAMPLE 4

Examples 3 and 4 show the effects of adding a high Mooney Viscosity chlorinated polyethylene polymer to ethylene-vinyl acetate based compositions. The ODR data shows a two-fold increase in peroxide vulcanizing efficiency in spite of a 10-fold increase in antioxidant level and a minimal increase in composition viscosity.

| INGREDIENTS | PARTS BY WEIGHT EXAMPLE 3 | PARTS BY WEIGHT EXAMPLE 4 |
|---|---|---|
| Ethylene-vinyl acetate copolymer LD-401 (melt index 3.1; acetate content 9%) Exxon Corp. | 100.00 | 100.00 |
| CPE 566 (36% chlorine 121° C. ML (1 + 3) = 90 Dow Chemical | 1.50 | 56.80 |
| Polymerized 2,2,4-trimethyl-di-hydroquinoline R. T. Vanderbilt | 0.27 | 2.45 |
| Dicumyl Peroxide* Hercules Inc. | 1.75 | 16.00 |
| Basic lead silicate sulfate NL Industries | 0.07 | 2.45 |
| Carbon black N-990 R. T. Vanderbilt | 4.33 | 39.20 |
| Total Parts by Weight | 107.92 | 216.90 |
| ODR Curve at 205° C. | | |
| Maximum torque (in-lbs) | 27.7 | 99.0 |
| Minimum torque (in-lbs) | 3.9 | 5.9 |
| Scorch time in minutes** | 1.2 | 0.5 |
| Time to 50% cure, in minutes | 1.9 | 0.95 |
| Time to 90% cure, in minutes | 2.9 | 1.45 |
| Effective crosslinking half-life | 0.57 minutes | 0.25 minutes |

*Note that in first order reactions, the rate of reaction (the crosslinking half-life) is independent of the amount of peroxide present in the composition.
**time in minutes when torque rises 2 in-lbs above minimum torque value

EXAMPLES 5, 6 and 7

Examples 5 and 6 show the effects of adding ethylene-vinyl acetate copolymer to clorinated polyethylene-based compositions. The ODR data shows no change in peroxide vulcanizing efficiency with a three-fold increase in antioxidant level. There is no evidence of changes in the effective crosslinking half-life of the compositions despite the use of peroxides with different molecular structures. It is known that dicumyl peroxide and α, α'-bis-(t-butylperoxy) diisopropylbenzene have about the same half-life in ethylenevinyl acetate copolymer at 205° C., i.e., about 0.2 minutes. Although the rheological properties of the two chlorinated polyethylene polymers differ greatly, the viscosity of the resultant compositions at 205° C. as indicated by the ODR minimum torque values are almost identical. They are low enough to assure the use of these compositions as extrusion stocks. It should be noted that liquid plasticizers were not employed in these recipes. This technique of the addition of EVA polymers resulting in the reducing of the viscosity of chlorinated polyethylene-based compositions is an innovation of the present invention.

| INGREDIENTS | PARTS BY WEIGHT EX. 5 | EX. 6 | EX. 7 |
|---|---|---|---|
| CPE 566 (36% chlorine) 121° C. ML (1+3) = 90 Dow Chemical | 100.00 | — | — |
| CPE 0136 (36% Chlorine) 100° C. ML (1+4) = 70 Dow Chemical | — | 100.00 | — |
| CPE MX 22432.29 (42% chlorine) melt viscosity at 150 sec.$^{-1}$ 26,000 poises | — | — | 100.00 |
| EVA LD 401 (9% vinyl acetate) melt index 3.1 g/10 min. Exxon | 64.4 | 50.0 | — |
| EVA DQDA 3737 (28% vinyl acetate) melt index 20 g/10 min. Union Carbide | — | — | 48.30 |
| Dicumyl peroxide Hercules Inc. | 3.70 | — | — |
| a,a'-bis-(t-butylperoxy) diisopropylbenzene Hercules Inc. | — | 3.20 | 2.87 |
| polymerized 2,2,4-trimethyl dihydroquinoline R. T. Vanderbilt | 0.57 | 1.60 | 1.56 |
| Basic lead silicate sulfate NL Industries | 9.95 | 13.85 | 13.30 |
| Antimony oxide Chemitron Corp. | 4.46 | 9.06 | 8.60 |
| Red color concentrate Wilson Products | — | — | 2.09 |
| Silane treated calcined clay Burgess Pigment | 44.00 | 35.15 | 31.80 |
| Total parts by Weight | 227.08 | 212.86 | 208.52 |
| ODR CURVE AT 205° C. | | | |
| Maximum torque (in-lbs) | 74.00 | 50.00 | 59.00 |
| Minimum torque (in-lbs) | 10.50 | 9.00 | 7.50 |
| Scorch time in minutes* | 0.50 | 0.60 | 0.55 |
| Time to 50% cure in minutes | 1.20 | 1.60 | 1.40 |

| -continued | | | |
|---|---|---|---|
| Time to 90% cure in minutes | 1.80 | 2.60 | 2.45 |
| Effective crosslinking half-life | 0.44 min. | 0.48 min. | 0.48 min. |

*time in minutes when torque rises 2 in-lbs above minimum torque value

In addition, the data presented indicates that the blend of chlorinated polyethylene and ethylene-vinyl acetate form a polymer system which can be efficiently crosslinked with peroxide vulcanizing agents. Compositions based on these polymer blends possess the rheological and curing properties which insure successful processing.

A comparison of Example formulations 5, 6 and 7 shows that the effective solvating of chlorinated polyethylene of various chlorine contents and of various rheological properties is achieved with ethylene-vinyl acetate copolymers of various vinyl acetate levels and of various rheological properties. Higher chlorine content chlorinated polyethylene, e.g., MX 2243.29—a crystalline, high viscosity polymer, is adequately solvated by the high vinyl acetate content ethylene copolymer which has a relatively low viscosity e.g., a melt index of 20 g/10 minutes at 190° C. Medium chlorine content chlorinated polyethylene with varying viscosities are also adequately solvated with relatively lower vinyl acetate content ethylene copolymers. In effect, the data from examples 5, 6, and 7 indicate that processible compositions based on blends of chlorinated polyethylene and ethylene-vinyl acetate copolymer are efficiently vulcanized by peroxide vulcanizing agents.

The data from the included recipes are unexpected and such results could not be anticipated within the current state of the art. An explanation describing the factors leading to these results is offered. It is not, however, intended that this invention be bound by these explanations. The data clearly shows that the rheological properties (the viscosity) of highly polar, highly viscous polymers are greatly altered by the addition of somewhat less polar, less viscous ethylene copolymers. The viscosities of such polymer blends more closely resembles that of the ethylene copolymers; in effect, making the highly polar polymers more workable in ordinary processing operations. This reduction in viscosity, or increase in workability, of these polymers is believed to be carried out by the solvating effect of the added ethylene copolymer. On a molecular scale, one can visualize a tightly bound group of polar polymer chains being held by electrostatic forces, such as by van der Waal forces, and/or by hydrogen bonding forces. Plasticizers of a non-polar nature such as oils and low molecular weight hydrocarbon polymers are ineffective in solvating these high molecular weight polar chains. More polar plasticizers such as the ester types may be somewhat more effective than the non-polar types, but they differ so greatly in molecular weight, viscosity, and molecular structure from the polymer chains that their solvating effect is minimal.

High molecular weight polymers with polar and/or bulky groups attached along the chain and which are characterized by relatively low viscosities at temperatures in the ranges normally used in polymer processing have been found to be effective solvating agents for highly polar polymers which are usually difficult to process. The solvating polymers, because of their polarity, high molecular weight, viscosity, and molecular structure cause the highly polar polymer chains to separate. The solvating polymer chains fill the interstices between the polymer chains being solvated. This model of the polymer blends explains the rheological results obtained from the examples given herein. The measured increase of crosslinking efficiency of peroxide vulcanizing agents can also be explained by this molecular model.

The solvated polymer chain once separated by the solvating polymer chains are effectively made more compatible with the smaller peroxide molecules; thereby increasing the solubility of peroxides in the polymer blend. Sterically, chain separation allows the peroxide molecules to fit into the polymer matrix. The close proximity and greater distribution of the peroxide molecules within the polymer matrix increases the crosslinking efficiency of the peroxide vulcanizing agents. This visualization also explains the unexpected result that antioxidant concentration does not alter the effective peroxide crosslinking half-life in the polymer blends cited in the present invention. That is, the partition of peroxide vulcanizing agents between polymer blends of chlorinated polyethylene (CPE) and ethylene-vinyl acetate (EVA) and other ingredients such as antioxidants is such that a higher concentration of the peroxide is dissolved in the polymer blend and a lesser amount is dissolved in the other ingredients comprising the composition. Upon peroxide decomposition, the generated free radicals can more effectively initiate polymer chain crosslinking. The vulcanizates thus formed will be characterized by a high crosslink density.

While there have been shown and described hereinabove possible embodiments of this invention, it is to be understood that the invention is not limited thereto and that various changes, alterations and modifications can be made thereto without departing from the spirit and scope thereof as defined in the appended claims.

What is claimed is:

1. A processible composition consisting essentially of
   (i) a saturated polar polymer selected from the group consisting of chlorinated polyethylene, chlorosulfonated polyethylene or poly(vinyl chloride);
   (ii) at least one ethylene copolymer, solid at 25° C., containing at least 50% by weight of ethylene and up to 50% by weight of one or more organic compounds which are interpolymerizable with ethylene containing a >C=C< ethylene linkage wherein the ethylene copolymer has a density between 0.92 and 0.96 as per ASTM D-792-60T and a Melt Index of 0.2 to 200 g/10 min. as per ASTM D-1238-62T and
   (iii) at least one peroxide vulcanizing agent, said composition comprising by weight to 100 parts of saturated polar polymer (i), about 10 to 400 parts by weight of ethylene copolymer (ii) and about 0.1 to 10 parts by weight of peroxide vulcanizing agent (iii), and said composition having a crosslinking half-life of about 0.2 to 1.5 minutes at 205° C.

2. The processible composition of claim 1, wherein said composition comprises, about 30 to 300 parts by weight of said ethylene copolymer to 100 parts by weight of polar polymer.

3. The composition of claim 1, wherein said peroxide vulcanizing agent is present in an amount of about 0.1 to 5.0 parts by weight to 100 parts of polar polymer.

4. The processible composition of claim 1, wherein said ethylene copolymer (ii) comprises an ethylene-vinyl acetate copolymer comprising the polymerized product of 100 parts by weight of ethylene and about 8 to 100 parts by weight of vinyl acetate and wherein said polymerized product has a melt index of about 1 to 150 g/10 minutes as per ASTM D-1238-62T.

5. The processible composition of claim 1, wherein said peroxide vulcanizing agent is selected from the group consisting of di-t-butyl peroxide, α,α'-bis-(t-butyl peroxy) diisopropylbenzene, 2,5-dimethyl-2,5-bis-(t-butylperoxy) hexyne-3, 2,5-dimethyl-2,5-bis-(t-butylperoxy)hexane and dicumyl peroxide.

6. The processible composition of claim 1, wherein said peroxide vulcanizing agent has the formula $$R'-(OOR)_x$$

wherein R' and R are alkyl or substituted alkyl and x is 1 or 2.

7. The processible composition of claim 1, wherein said saturated polar polymer is chlorosulfonated polyethylene having from about 20 to 50% by weight chlorine and about 0.75 to 1.5% by weight sulfur.

8. The processible composition of claim 1, wherein said saturated polar polymer is polyvinyl chloride having about 55% by weight chlorine.

9. The processible composition of claim 1, wherein said saturated polar polymer is chlorinated polyethylene.

10. The processible composition of claim 1, wherein said saturated polar polymer is chlorosulfonated polyethylene.

11. The processible composition of claim 1, wherein said saturated polar polymer is polyvinyl chloride.

12. The processible composition of claim 1, wherein said ethylene copolymer is a copolymer with a monomer selected from the group consisting of bicycloheptadiene, styrene, vinyl acetate or ethyl acrylate.

13. The processible composition of claim 6, wherein R' and R are alkyl groups of about 4 to 15 carbon atoms.

14. The processible composition of claim 1, said composition further comprising
(iv) an antioxidant in an amount of from about 0.1 to 3.0 parts by weight for 100 parts by weight of the total polymer in the composition.

* * * * *

REEXAMINATION CERTIFICATE (642nd)
United States Patent [19]
Alia

[11] B1 4,180,531

[45] Certificate Issued Mar. 10, 1987

[54] PROCESSIBLE AND VULCANIZABLE POLAR POLYMERS

[76] Inventor: Dominic Alia, 1609 Sheridan St., Williamsport, Pa. 17701

Reexamination Request:
No. 90/000,731, Feb. 25, 1985

Reexamination Certificate for:
Patent No.: 4,180,531
Issued: Dec. 25, 1979
Appl. No.: 742,398
Filed: Nov. 16, 1976

[51] Int. Cl.$^4$ .................. C08L 23/08; C08L 23/28; C08L 23/34
[52] U.S. Cl. ........................... 525/214; 525/239; 525/263; 525/194
[58] Field of Search ............... 525/214, 194, 239, 263

[56] References Cited

U.S. PATENT DOCUMENTS

| | | | |
|---|---|---|---|
| 3,326,833 | 6/1967 | Raley | 524/411 |
| 3,639,529 | 2/1972 | Mackenzie, Jr. et al. | 260/897 C |
| 3,738,866 | 6/1973 | Martens | 117/232 |

OTHER PUBLICATIONS

The Vanderbilt Rubber Handbook (1958), p. 374.

*Primary Examiner*—Wilbert J. Briggs, Sr.

[57] ABSTRACT

A method of promoting peroxide initiated crosslinking of polar polymers whereby the solubility of peroxide vulcanizing agents in these materials is increased. Increased peroxide solubility and/or processibility is accomplished by blending certain ethylene copolymers with these highly polar polymers. The blending of ethylene copolymers with the polar polymers substantially reduces the viscosity of the latter polymers thereby enhancing their processibility.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 is cancelled.

Claim 1 is determined to be patentable as amended.

Claims 2-11, 13 and 14, dependent on an amended claim, are determined to be patentable.

1. A processible composition consisting essentially of
   (i) a saturated polar polymer selected from the group consisting of chlorinated polyethylene, chlorosulfonated polyethylene [or] *and* poly(vinyl chloride);
   (ii) at least one ethylene copolymer, solid at 25° C., containing at least 50% by weight of ethylene and up to 50% by weight of [one or more organic compounds which are interpolymerizable with ethylene containing a >C=C< ethylene linkage] *at least one of vinyl acetate and ethyl acrylate, with the proviso that when said ethylene copolymer contains vinyl acetate, the vinyl acetate is present in an amount of at least 8 parts per 100 parts by weight of ethylene*, wherein the ethylene copolymer has a density between 0.92 and 0.96 as per ASTM D-792-60T and a Melt Index of 0.2 to 200 g/10 min. as per ASTM D-1238-62T; and
   (iii) at least one peroxide vulcanizing *or cross-linking* agent *as the only vulcanizing or cross-linking agent in said composition*, said composition comprising [by weight to 100 parts of saturated polar polymer (i),] about 10 to 400 parts by weight of ethylene copolymer [(ii)] and about 0.1 to 10 parts by weight of peroxide vulcanizing agent *per 100 parts of saturated polar polymer,* [(iii),] and said composition having a cross-linking half-life of about 0.2 to 1.5 minutes at 205° C., *a minimum torque value in the range of 2 to 15 in-lbs. at 205° C., and a scorch time in the range of 0.5 to 2.0 minutes at 205° C.*

* * * * *